United States Patent
Molnar

(10) Patent No.: US 6,312,627 B1
(45) Date of Patent: Nov. 6, 2001

(54) METHOD FOR PREPARING CERAMIC COMPOSITIONS

(75) Inventor: Linda Katherine Molnar, Horsham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/678,860

(22) Filed: Oct. 3, 2000

Related U.S. Application Data

(60) Provisional application No. 60/157,704, filed on Oct. 5, 1999.

(51) Int. Cl.$^7$ ................. B29B 9/00; B28B 1/26
(52) U.S. Cl. ................. 264/6; 264/86; 264/651; 106/239; 106/241; 106/287.17
(58) Field of Search ................. 264/6, 651, 86; 106/239, 241, 287.17

(56) References Cited

U.S. PATENT DOCUMENTS

| | | | |
|---|---|---|---|
| 4,968,460 | 11/1990 | Thompson et al. | 264/6 |
| 5,474,724 | * 12/1995 | Fukao | 264/86 |
| 5,487,855 | 1/1996 | Moeggenborg et al. | 524/430 |
| 5,908,889 | 6/1999 | Bailey et al. | 524/437 |

OTHER PUBLICATIONS

James S. Reed, *Principles of Ceramic Processing*, Second Ed., John Wiley and Sons, p 204, New York, 1995.

Whitman et al., "Humidity Sensitivity of Dry Press Binders," Paper No. SXVIIb–92–94, presented at the 96$^{th}$ Annual Meeting of the American Ceramic Society, Indianapolis, IN, Apr. 25, 1994.

* cited by examiner

*Primary Examiner*—Christopher A. Fiorilla
(74) *Attorney, Agent, or Firm*—Thomas J. Howell

(57) ABSTRACT

A method for preparing ceramic particle slurries having controlled rheological properties to allow further processing to ceramic green bodies with improved compaction, green strength and green density is disclosed. Polymer additives containing 0.1 to 20% of acrylic acid and/or methacrylic acid monomer units are especially useful in controlling the viscosity of high solids aqueous slurries of ceramic particles and acting as binders to improve the strength of finished ceramic articles, such as sinks, spas, bathroom fixtures and sanitaryware.

9 Claims, No Drawings

METHOD FOR PREPARING CERAMIC COMPOSITIONS

CROSS REFERENCE TO RELATED PATENT APPLICATIONS

This is a non-provisional application of prior pending U.S. provisional application Ser. No. 60/157,704 filed Oct. 5, 1999.

BACKGROUND

This invention relates to the use of polymeric additives providing increased plasticity, density and strength in the formation of ceramic articles. In particular the present invention involves the use of selected polymer additives together with mineral matrix materials to provide ceramic green bodies, such as those used in sanitaryware articles, having improved green strength and reduced loss to waste byproduct. In addition, the selected polymer additives facilitate handling at processing stages prior to green body formation by enabling high solids ceramic particle slurries to be prepared having viscosities controllable within a selected range.

Ceramic materials are typically prepared by mixing powdered ceramic oxides in an aqueous slurry together with processing aids, such as dispersants and binders. The slurry may be dewatered to produce ceramic particles, after which the particles are aggregated (compacted) into a "green body" having a desired shape; alternatively, the slurry may be charged to a mold where combined shape forming and dewatering occurs to form the green body. Green bodies are subjected to heat treatment (sintering) to convert the green body into a "fired ceramic" having satisfactory strength and durability characteristics for use in a variety of products, for example, chromatographic media, grinding aids, abrasives, catalysts, adsorbents, tableware, tiles, electronic components, construction components, machine components, and particularly sinks, spas, bathroom fixtures, sanitaryware and architectural articles.

The properties of the green bodies generally affect the properties of the final ceramic product. If the green density of the green body is too low, the mechanical properties of the article, such as hardness and toughness, will diminish. If the green strength is too low, it becomes difficult or impossible to process the green body. Thus, it is desirable to provide ceramic green bodies with sufficient green densities and green strengths. Green density is determined by how well the ceramic materials are compacted during processing.

Lack of plasticity in ceramic particles results in increased hardness of the green body. Increased hardness reduces compaction of the particles during green body formation, and therefore reduces the density of the green bodies after compaction. Low green density results in a low density after sintering which reduces mechanical strength of the final ceramic product.

Common plasticizers have been used to improve green body properties; and these include water, ethylene glycols, polyethylene glycols, glycerol, dibutyl phthalate and dimethyl phthalate (James S. Reed, *Principles of Ceramic Processing*, Second Ed., John Wiley and Sons, p 204, New York, 1995). These plasticizers are either water-soluble or water-insoluble. Water-insoluble plasticizers are difficult to incorporate into ceramic slurries that are water based. The water-soluble plasticizers are also less desirable since they are sensitive to changes in humidity, that is, they are hygroscopic. Thus, ceramic green bodies made by processes using these water-soluble plasticizers exhibit variability in compaction, green density, green strength, shrinkage and die sticking as the humidity varies (Whitman et al., "*Humidity Sensitivity of Dry Press Binders,*" Paper No. SXVIIb-92–94, presented at the 96$^{th}$ Annual Meeting of the American Ceramic Society, Indianapolis, Ind., Apr. 25, 1994). In addition, since the aforementioned plasticizers are either small molecules or very low molecular weight polymers, they provide little or no adhesion for ceramic powders during processing. The ceramic green bodies processed with these types of plasticizers have reduced strength.

One method for increasing compaction, thus increasing green density and green strength of ceramic green bodies, is to use a binder as a processing aid. U.S. Pat. No. 5,487,855 discloses binders for use in ceramic materials based on water-soluble hydrolyzed copolymers made from monomers having ester or amide functional groups. U.S. Pat. No. 5,908,889 discloses the use of water-soluble polyamides made by condensation polymerization as binders for ceramic materials. Because they are water-soluble, these binders have the disadvantage of being sensitive to changes in humidity and the potential for causing variability in properties during processing.

U.S. Pat. No. 4,968,460 discloses several classes of emulsion polymers useful as binders for ceramic materials, including acrylate ester polymers. These binders provide increased green strength and green density to the ceramic green bodies when the green body is subjected to an energy treatment step, such as electron beam irradiation, X-ray irradiation, ultraviolet radiation, heating treating from 50° C. to 200° C. or combinations of heat and pressure; the additional treatments add time and cost during production of ceramic green bodies.

The present invention seeks to overcome problems involving the use of prior art additives in preparing ceramic compositions by using selected polymer additives that provide ceramic particle slurries having controlled viscosity characteristics, thus allowing the desired additives to be formulated into the ceramic composition without detracting from the handling properties of the slurries used to prepare green bodies, especially where processing steps involving slurry storage, slurry transfer, spray drying, slip casting or filter pressing are involved.

STATEMENT OF INVENTION

The present invention provides a method for preparing a ceramic composition comprising (a) forming an aqueous ceramic slurry comprising from 45 to 85 weight percent mineral matrix material, based on weight of the aqueous ceramic slurry, and from 0.05 to 10 weight percent polymeric additive, based on weight of the mineral matrix material; (b) dewatering the aqueous ceramic slurry to form a mineral matrix material-polymer additive composite by a process selected from one or more of spray drying, slip casting and filter pressing; (c) compacting the mineral matrix material-polymer additive composite to form a green body; and (d) sintering the green body; wherein the polymer additive is selected from one or more polymers comprising as polymerized units from 0.1 to 20 weight percent, based on weight of the polymer, of acid-containing monomer selected from one or more of acrylic acid, methacrylic acid and the alkali metal and ammonium salts thereof; and wherein the aqueous ceramic slurry retains a viscosity of at least 0.15 to less than 1.5 pascal·seconds, for at least 24 hours after the polymer additive has been added to the aqueous ceramic slurry.

The present invention further provides a method for stabilizing an aqueous ceramic slurry comprising (a) forming an aqueous ceramic slurry comprising from 45 to 85 weight percent mineral matrix material, based on total weight of the aqueous ceramic slurry; and (b) adding 0.05 to 10 weight percent polymeric additive, based on weight of mineral matrix material, to the aqueous ceramic slurry; wherein the polymer additive is selected from one or more polymers comprising as polymerized units from 0.1 to 20 weight percent, based on weight of the polymer, of acid-containing monomer selected from one or more of acrylic acid, methacrylic acid and the alkali metal and ammonium salts thereof; and wherein the aqueous ceramic slurry retains a viscosity of at least 0.15 to less than 1.5 pascal·second, for at least 24 hours after the polymer additive has been added to the aqueous ceramic slurry.

DETAILED DESCRIPTION

The process of the present invention is useful for preparing a range of ceramic compositions suitable for use in forming finished articles, such as sanitaryware, and bathroom and kitchen fixtures. I have discovered that the use of selected polymer additives in formulating green body compositions results in stabilization and control of the rheological characteristics (such as viscosity and mixture homogeneity) of high solids ceramic slurries, thus allowing for unencumbered transfer and processing of the ceramic slurries, while at the same time providing improved strength and performance properties in the finished ceramic article.

As used herein, the term "alkyl (meth)acrylate" refers to either the corresponding acrylate or methacrylate ester; similarly, the term "(meth)acrylic" refers to either acrylic or methacrylic acid and the corresponding derivatives, such as esters or amides. As used herein, all percentages referred to will be expressed in weight percent (%), based on total weight of polymer or composition involved, unless specified otherwise. As used herein, the term "copolymer" refers to polymer compositions containing units of two or more different monomers. "Emulsion-form polymer" as used herein refers to a water-insoluble polymer that is prepared by emulsion polymerization techniques. "Glass transition temperature," or "$T_g$," as used herein, means the temperature at or above which a glassy polymer will undergo segmental motion of the polymer chain.

Polymeric additives suitable for use in the method of this invention typically have a $T_g$ within the range of −50° C. to +90° C. and preferably from −50° C. to +50° C. The $T_g$ of a polymer can be measured by various techniques including, for example, differential scanning calorimetry (DSC).

Polymer additives useful in the present invention typically have a weight average molecular weight ($M_w$) of 30,000 to 2,000,000, preferably from 50,000 to 1,000,000, and more preferably from 100,000 to 500,000. Weight average molecular weights are based on gel permeation chromatography (GPC) analysis using known polymer standards appropriate for the polymer compositions involved.

While not wishing to be bound by theory, we believe that, in the case of the present invention, polymers containing from 0.1 to 20% of acrylic acid or methacrylic acid monomer units are able to provide enhanced strength in the resultant green body composition while at the same time providing ceramic particle slurries having controlled and beneficial rheological properties that facilitate processing through the various stages of ceramic article formation.

The polymer additives may be prepared by any of the conventional methods known for polymerization: bulk, suspension, solution or emulsion techniques. Water-insoluble vinyl polymers are particularly preferred; especially preferred are emulsion-form polymers since they provide insensitivity to humidity of intermediates as well as the resultant green body composition during processing.

Preferred polymer additives useful in the method of the present invention include, for example, acrylic polymers and copolymers formed from ($C_1$–$C_{22}$)alkyl (meth)acrylate esters such as, for example, methyl acrylate, ethyl acrylate, propyl acrylate, isopropyl acrylate, butyl acrylate, isobutyl acrylate, secondary butyl acrylate, t-butyl acrylate, pentyl acrylate, neopentyl acrylate, hexyl acrylate, heptyl acrylate, octyl acrylate, isooctyl acrylate, 2-ethylhexyl acrylate, decyl acrylate, isodecyl acrylate, lauryl acrylate, bornyl acrylate, isobornyl acrylate, myristyl acrylate, pentadecyl acrylate, stearyl acrylate, methyl methacrylate, ethyl methacrylate, propyl methacrylate, isopropyl methacrylate, butyl methacrylate, isobutyl methacrylate, hexyl methacrylate, octyl methacrylate, isooctyl methacrylate, decyl methacrylate, isodecyl methacrylate, lauryl methacrylate, bornyl methacrylate, isobornyl methacrylate, myristyl methacrylate, pentadecyl methacrylate, stearyl methacrylate, eicosyl methacrylate and behenyl methacrylate. Preferred (meth)acrylate esters include methyl acrylate, ethyl acrylate, butyl acrylate, 2-ethylhexyl acrylate, methyl methacrylate, butyl methacrylate, isodecyl methacrylate and lauryl methacrylate.

The polymeric additives useful in the present invention contain, as polymerized units, from 0.1 to 20%, typically less than 20%, preferably from 0.5 to 15%, more preferably from 1 to 10% and most preferably from 2 to 5%, of one or more acid-containing monomers selected from one or more of acrylic acid, methacrylic acid and the alkali metal and ammonium salts thereof. In addition to the acrylic acid or methacrylic acid monomer units, up to 10% of other acid-containing monomers may be present, such as itaconic acid, maleic acid, fumaric acid, and the alkali metal (for example, sodium and potassium) and ammonium salts thereof. The preferred acid-containing monomer is acrylic acid and the corresponding alkali metal and ammonium salts thereof.

Polymeric additives useful in the present invention optionally contain, as polymerized units, from zero to 70%, and preferably from 15 to 65%, of one or more vinyl or vinylidene monoaromatic monomers. Suitable vinyl or vinylidene monoaromatic monomers include, for example, styrene, and styrene that is substituted on the aromatic ring with one or more ($C_1$–$C_4$)alkyl radicals, hydroxyl radicals, chlorine atoms or bromine atoms. Preferably, the vinyl or vinylidene monoaromatic monomer is styrene, α-methyl styrene, chlorostyrene or vinyl phenol, and is more preferably styrene.

Preferred polymeric additives useful in the present invention may contain, as polymerized units, up to about 10% of one or more other copolymerizable monomers. Suitable other copolymerizable monomers include, for example, butadiene, acrylonitrile, ethylene, vinyl acetate, hydroxyalkyl (meth)acrylates, amides of ($C_3$–$C_6$)ethylenically unsaturated carboxylic acids, amides of ($C_3$–$C_6$) ethylenically unsaturated carboxylic acids that are substituted at the nitrogen by one or two ($C_1$–$C_4$)alkyl groups, acrylamide, methacrylamide and N-methylol (meth)acrylamide.

Preferably, the polymer additives of the present invention include, for example, polymers comprising as polymerized units (i) from 25 to 98% of one or more ($C_1$–$C_{22}$)alkyl (meth)acrylate monomers, (ii) from 0.1 to 20% of acid-containing monomer selected from one or more of acrylic acid and methacrylic acid, (iii) from 0 to 10% of one or more ($C_4$–$C_6$))ethylenically unsaturated carboxylic acids other than methacrylic acid, and (iv) from 0 to 70% of one or more unsaturated vinyl or vinylidene monoaromatic monomers. More preferably, the polymer additives are based on polymers comprising as polymerized units (i) from 30 to 80% of one or more ($C_1$–$C_8$)alkyl (meth)acrylate monomers, (ii) from 1 to 10% of acid-containing monomer selected from one or more of acrylic acid and methacrylic acid, and (iii) from 15 to 65% of one or more unsaturated vinyl or vinylidene monoaromatic monomers. Preferably, the acid-containing monomer is acrylic acid and the unsaturated vinyl or vinylidene monoaromatic monomer is styrene.

Raw mineral matrix materials useful in the method of the present invention, include, for example, shales, stoneware clay, tile clay, crude bauxite, crude kyanite, natural ball clay, bentonite, ball clay, kaolin, calcined kaolin, refined bentonite, pyrophyllite, talc, feldspar, silica, nepheline syenite, wollastonite, spodumene, glass sand, flint (quartz), kyanite, bauxite, zircon, rutile, chrome ore, dolomite, alumina, zirconia, zirconates, silica, titania, titanates, cordierite, iron oxides, ferrites and kaolinites. The preferred mineral matrix materials are selected from one or more of stoneware clay, tile clay, natural ball clay, ball clay, feldspar, silica, flint and ferrites.

Optionally, the raw mineral matrix materials may be mixed with conventional adjuvants, known to those skilled in the art, for various purposes, for example: dispersants, inert fillers, pigments, and processing aids (such as spray drying aids, lubricants and mold-release agents).

Typically, dispersants are used to distribute and suspend the mineral matrix material in the carrier medium, for example, in an aqueous slurry. When dispersants are used, the aqueous slurry mixtures comprise from 0.01 to 2% and preferably from 0.1 to 1%, based on weight of mineral matrix material, of anionic dispersant. Suitable anionic dispersants include, for example, polyacrylic acid, acrylic acid/maleic acid copolymer, lauryl sulfate, dodecylbenzenesulfonate, pyrophosphate, and the water-soluble salts thereof, such as ammonium and alkali metal (potassium and sodium) salts.

Conventional pigments (colorants) include inorganic minerals (such as, for example, cadmium, chromates, iron blue, cobalt blue and ultramarine blue). In addition, these same conventional adjuvants may be conveniently added at later stages in the production of the ceramic composition, for example, during formation of the particulate material mixture, dewatering step or as part of the compaction step.

When present, the amount of optional adjuvants is typically from 0.05 to 50%, preferably from 0.1 to 20%, and more preferably from 0.5 to 10%, based on weight of mineral matrix material, of adjuvants selected from one or more of dispersant, inert filler, pigment and processing aids.

The ceramic compositions may be produced by converting raw mineral matrix materials to a fine powder form by conventional means (such as ball-milling or agitation) and dispersing the powdered matrix material in water in the presence of conventional dispersants (such as polyacrylate salts or sodium pyrophosphate) to provide a mixture, typically in the form of a slurry; optionally, inorganic pigment additives may be included in the preparation of this mixture. The slurry mixture typically contains from 45 to 85%, preferably from 50 to 80% and more preferably from 60 to 75%, mineral matrix material, based on total weight of the slurry mixture. Typically, the slurry is then mixed with the polymer additive by any conventional mixing method (such as mechanical stirring, kneading or ballmilling). The slurry mixture typically contains 0.05 to 10%, preferably 0.1 to 5%, more preferably 0.2 to 3% and most preferably from 0.5 to 2%, polymer additive, based on total weight of mineral matrix material. The resultant slurry mixture may be transferred to a spray drying unit, a slipcast mold or a filter press device for dewatering, followed by compaction to a green body. Preferably the slurry mixture is transferred to a slipcast mold, followed by draining and stiffening to form the green body.

The slipcasting step produces a green body in a desired molded article configuration suitable for use as a finished product as, for example, spa, countertops, bathroom fixtures, kitchen fixtures and sanitaryware.

Additional suitable methods useful for compaction of the dewatered ceramic slurry, include, for example, dry pressing, isostatic pressing, extrusion and jiggering.

The green bodies are typically formed (compacted) under pressurized conditions (typically at least 3.5 megaPascals or MPa (500 pounds per square inch or psi), and more preferably from 13.8 MPa or (2,000 psi) to 345 MPa or (50,000 psi)), optionally subjected to a drying step to remove residual moisture, and then subjected to a sintering step in a kiln (typical temperatures of 1100° C. to 1500° C.) to produce the ceramic product.

Some embodiments of the invention are described in detail in the following Examples. All ratios, parts and percentages (%) are expressed by weight unless otherwise specified, and all reagents used are of good commercial quality unless otherwise specified.

EXAMPLE 1

Procedure for Preparing Ceramic Mixture Slurries

An aqueous slurry (74% solids) of mineral matrix material (ball clay, ferrite and flint) having a pH (20–25° C.) of 6.0 was used as a starting material (Slurry A) to prepare ceramic green bodies. Starting viscosity of Slurry A was measured at 20–25° C. and at 32° C. (90° F.): 1.400 pascal·second (Pa·s) or 1400 centipoise (cP), spindle #4 at 60 revolutions per minute (rpm); and 0.806 Pa·s or 806 cP, spindle #3 at 100 rpm, respectively. The viscosities were measured using a Brookfield programmable Rheometer.

Five samples of the aqueous slurry were each treated with 0.1% dispersant (polyacrylic acid, ammonium salt), based on weight of mineral matrix material, and mixed by ball-milling for 24 hours, after which the pH and viscosity values were measured: average pH was 6.2; average viscosity at 20–25° C. (spindle #3 at 60 rpm) was 0.396 (±0.033) Pa·s; and average viscosity at 32° C. (spindle #3 at 100 rpm) was 0.262 (±0.024) Pa·s.

EXAMPLE 2

Evaluation of Slurry Stability (Fluidity).

Five polymer additives were evaluated for their effectiveness in stabilizing and controlling the viscosity of the ceramic particle slurry described in Example 1. The polymer additives were provided as aqueous emulsions (45–55% polymer solids) containing 0.1–2% (based on polymer solids) of sodium dodecylbenzenesulfonate surfactant, except for polymer additive #3 which contained mixed sodium lauryl sulfate and ethoxylated octylphenol surfactants (6%).

Polymer 1: emulsion polymer ($T_g$=−26° C.) of 85% butyl acrylate, 12% methyl methacrylate, 1.6% methacrylic acid, 1% ethyleneureamethacrylate.

Polymer 2: emulsion polymer of 65% butyl acrylate, 34% methyl methacrylate, 0.8% methacrylic acid.

Polymer 3: emulsion polymer of 96% ethyl acrylate and 4% methylolated acrylamide.

Polymer 4: emulsion polymer ($T_g$=+40° C.) of 33% ethylhexyl acrylate, 63% styrene, 4% acrylic acid.

Polymer 5: emulsion polymer of 76% butyl acrylate, 19% styrene, 3.5% acrylic acid and 1.5% itaconic acid.

Five separate samples of the aqueous ceramic slurry containing dispersant described in Example 1 were treated with 0.5% polymer additive (Polymers 1–5), based on weight of mineral matrix material. Ceramic slurry samples were prepared by combining 147 grams of Slurry A (Example 1), with 0.3 grams dispersant solution (35% in aqueous solution), followed by ballmilling. Slip samples were then prepared by adding 1.0–1.2 grams of polymer additive emulsion (45–55% aqueous emulsion) to the ball-milled slurries, followed by rolling agitation mixing for 24 hours, after which pH and viscosity values were measured. The average pH values were unchanged from the original ceramic slurry containing dispersant; the viscosity data are summarized in Table I.

TABLE I

| Slurry with Polymer # | Viscosity (Pa · s) at 20–25° C. | Viscosity (Pa · s) at 32° C. |
| --- | --- | --- |
| 1 (0.5%) | 4.000 | 3.085 |
| 2 (0.5%) | 0.960 | 0.589 |
| 3 (0.5%) | gelled | gelled |
| 4 (0.5%) | 0.400 | 0.269 |
| 5 (0.5%) | 0.360 | 0.320 |

Fluidity of the ceramic slurries is typically characterized by viscosities of at least 0.15 and less than 1.5 Pa·s (150 to 1500 cP) at ambient temperatures (20–25° C.) in order to allow satisfactory handling and processing of the slurry throughout the conversion of the slurry from its original state into a final finished ceramic article. Preferably, the slurries containing various amounts of additives (such as binders to improve green body strength and other handling properties) have viscosities from 0.2 to 1.0 Pa·s (200 to 1000 cP), and more preferably from 0.3 to 0.6 Pa·s (300 to 600 cP); viscosities are preferably within the aforementioned ranges at both ambient temperature and elevated temperatures, for example at 32° C. (90° F.). For the purposes of the present invention, viscosity values were measured at shear rates of 60 rpm, spindle #3 or #4 at 20–25° C.; and at 100 rpm, spindle #4 at 32° C.

For example, the ceramic slurry is typically maintained in a mixing or storage unit as it is being fed into the next stage of the manufacturing process (spray drying, slip casting mold or filter press unit); it is desirable that the viscosity of the slurry at this stage can be maintained for extended periods of time (at least 24 hours, preferably for at least 48 hours and more preferably for at least 1 week) thus allowing for easy pumping and transfer of the slurry.

It is desirable that the presence of the additives used as binders to improve green body properties does not significantly affect the handling characteristics of the ceramic slurries. From Table I it can be seen that polymer additives #2, #4 and #5 satisfy these requirements (all of which contain polymerized acrylic acid or methacrylic acid monomer units), whereas polymer additives #1 and #3 (neither of which contain polymerized acrylic acid monomer units) are either incompatible with the slurry (gelation of slurry #3) or produce an extremely high viscosity, similar to that of paste or glue.

Three of the polymer additives were evaluated further at an increased level of additive (0.75–1.0%, based on weight of mineral matrix material); viscosity data are summarized in Table II. Although the increased usage level of polymer additive #2 results in an undesirable viscosity, the two polymer additives (#4 and #5) containing polymerized acrylic acid units can be incorporated into the ceramic compositions at these increased levels without significantly increasing the viscosity of the original slurry (approximately 0.4 Pa·s or 400 cP at 20–25° C. and 0.26 Pa·s or 260 cP at 32° C.). This illustrates that these polymer additives (useful as binders to improve green body properties) may be successfully incorporated into the ceramic composition manufacturing process without negatively affecting the processability of the ceramic slurries containing the additives.

TABLE II

| Slurry with Polymer # | Viscosity (Pa · s) at 20–25° C. | Viscosity (Pa · s) at 32° C. |
| --- | --- | --- |
| 2 (0.75%) | 4.500 | 3.657 |
| 4 (1.0%) | 0.620 | 0.423 |
| 5 (1.0%) | 0.415 | 0.327 |

The ceramic particle slurries containing polymer additives #4 and #5 can be further processed via slipcasting to show increased green body strength and durability over that of green bodies based on ceramic particle slurries containing no polymer additive. The increased strength and durability of the green bodies based on polymer additives #4 and #5 also results in reduced loss to waste byproduct during the casting, firing and finishing steps in the production of the finished ceramic articles.

We claim:

1. A method for preparing a ceramic composition comprising:
   (a) forming an aqueous ceramic slurry comprising from 45 to 85 weight percent mineral matrix material selected from one or more of stoneware clay, tile clay, natural ball clay, ball clay, feldspar, silica, flint and ferrites, based on weight of the aqueous ceramic slurry, and from 0.05 to 10 weight percent polymeric additive, based on weight of the mineral matrix material;
   (b) dewatering the aqueous ceramic slurry to form a mineral matrix material-polymer additive composite by a process selected from one or more of spray drying, slip casting and filter pressing;
   (c) compacting the mineral matrix material-polymer additive composite to form a green body; and
   (d) sintering the green body;
wherein the polymer additive is selected from one or more polymers comprising as polymerized units from 0.1 to 20 weight percent, based on weight of the polymer, of acid-containing monomer selected from one or more of acrylic acid, methacrylic acid and the alkali metal and ammonium salts thereof; and wherein the aqueous ceramic slurry retains a viscosity of at least 0.15 to less than 1.5 pascal·seconds, for at least 24 hours after the polymer additive has been added to the aqueous ceramic slurry.

2. The method of claim 1 wherein steps (b) and (c) comprise transferring the slurry to a slipcast mold and forming the green body by draining and stiffening in the slipcast mold.

3. The method of claim 1 wherein the viscosity of the aqueous ceramic slurry is from 0.3 to 0.6 pascal·second.

4. The method of claim 1 comprising adding 0.2 to 3 weight percent polymeric additive, based on weight of the mineral matrix material.

5. The method of claim 1, wherein the aqueous ceramic slurry further comprises from 0.01 to 2 weight percent, based on weight of mineral matrix material, of anionic dispersant.

6. The method of claim 1 comprising forming an aqueous ceramic slurry comprising from 60 to 75 weight percent mineral matrix material.

7. A method for preparing a ceramic composition comprising:
   (a) forming an aqueous ceramic slurry comprising from 45 to 85 weight percent mineral matrix material, based on weight of the aqueous ceramic slurry, and from 0.05 to 10 weight percent polymeric additive, based on weight of the mineral matrix material;
   (b) dewatering the aqueous ceramic slurry to form a mineral matrix material-polymer additive composite by a process selected from one or more of spray drying, slip casting and filter pressing;
   (c) compacting the mineral matrix material-polymer additive composite to form a green body; and
   (d) sintering the green body;
   wherein the polymer additive is selected from one or more polymers comprising as polymerized units (i) from 25 to 98% of one or more $(C_1–C_{22})$alkyl (meth)acrylate monomers, (ii) from 0.1 to 20% of acid-containing monomer selected from one or more of acrylic acid, methacrylic acid and the alkali metal and ammonium salts thereof, (iii) from 0 to 10% of one or more $(C_4–C_6)$ethylenically unsaturated carboxylic acids other than methacrylic acid, and (iv) from 0 to 70% of one or more unsaturated vinyl or vinylidene monoaromatic monomers; and wherein the aqueous ceramic slurry retains a viscosity of at least 0.15 to less than 1.5 pascal·seconds, for at least 24 hours after the polymer additive has been added to the aqueous ceramic slurry.

8. A method for preparing a ceramic composition comprising:
   (a) forming an aqueous ceramic slurry comprising from 45 to 85 weight percent mineral matrix material, based on weight of the aqueous ceramic slurry, and from 0.05 to 10 weight percent polymeric additive, based on weight of the mineral matrix material;
   (b) dewatering the aqueous ceramic slurry to form a mineral matrix material-polymer additive composite by a process selected from one or more of spray drying, slip casting and filter pressing;
   (c) compacting the mineral matrix material-polymer additive composite to form a green body; and
   (d) sintering the green body;
   wherein the polymer additive is selected from one or more polymers comprising as polymerized units (i) from 30 to 80% of one or more $(C_1–C_8)$alkyl (meth)acrylate monomers, (ii) from 1 to 10% of acid-containing monomer selected from one or more of acrylic acid, methacrylic acid and the alkali metal and ammonium salts thereof, and (iii) from 15 to 65% of one or more unsaturated vinyl or vinylidene monoaromatic monomers; and wherein the aqueous ceramic slurry retains a viscosity of at least 0.15 to less than 1.5 pascal·seconds, for at least 24 hours after the polymer additive has been added to the aqueous ceramic slurry.

9. A method for stabilizing an aqueous ceramic slurry comprising:
   (a) forming an aqueous ceramic slurry comprising from 45 to 85 weight percent mineral matrix material selected from one or more of stoneware clay, tile clay, natural ball clay, ball clay, feldspar, silica, flint and ferrites, based on total weight of the aqueous ceramic slurry; and
   (b) adding 0.05 to 10 weight percent polymeric additive, based on weight of mineral matrix material, to the aqueous ceramic slurry;
   wherein the polymer additive is selected from one or more polymers comprising as polymerized units from 0.1 to 20 weight percent, based on weight of the polymer, of acid-containing monomer selected from one or more of acrylic acid, methacrylic acid and the alkali metal and ammonium salts thereof; and wherein the aqueous ceramic slurry retains a viscosity of at least 0.15 to less than 1.5 pascal·second, for at least 24 hours after the polymer additive has been added to the aqueous ceramic slurry.

* * * * *